United States Patent [19]
Ennis, III et al.

[11] Patent Number: 4,785,629
[45] Date of Patent: Nov. 22, 1988

[54] SYRINGE-DISPENSED BRAKE FLUID FOR FILLING AND PURGING MASTER CYLINDER CIRCUIT FROM SLAVE

[76] Inventors: James F. Ennis, III, Rte. 2, RFD #5, Preston, Conn. 06360; Joseph L. Caisse, 48 Hunters Ave., Taftsville, Conn. 06380

[21] Appl. No.: 58,154

[22] Filed: Jun. 4, 1987

[51] Int. Cl.⁴ .......................... F15B 7/10; B60T 11/30
[52] U.S. Cl. ...................................... 60/584; 188/352
[58] Field of Search .................. 60/581, 584, 327; 188/352; 222/386, 391

[56] References Cited

U.S. PATENT DOCUMENTS

| | | | |
|---|---|---|---|
| 2,128,254 | 8/1938 | Kile | 222/386 X |
| 2,295,539 | 9/1942 | Beach | 188/352 |
| 2,524,544 | 10/1950 | Seawell | 188/352 |
| 3,359,994 | 12/1967 | LaPointe | 188/352 |
| 3,590,963 | 7/1971 | Wright et al. | 188/352 |
| 3,809,359 | 5/1974 | Truelove, Sr. | 188/352 |
| 4,038,823 | 8/1977 | Mostert | 60/584 |
| 4,236,549 | 12/1980 | Salzmann | 60/584 |
| 4,503,678 | 3/1985 | Wimbush | 60/584 |
| 4,599,860 | 7/1986 | Parsons | 60/584 |
| 4,716,732 | 1/1988 | Tordoff | 60/584 |

OTHER PUBLICATIONS

Carley, L. "Bleeding Brakes," in *Brake and Front End*, Aug. 1987, pp. 22-24.

*Primary Examiner*—Robert E. Garrett
*Assistant Examiner*—George Kapsalas
*Attorney, Agent, or Firm*—Edward H. Loveman

[57] ABSTRACT

This apparatus for removing air from a hydraulic system having a master cylinder, a wheel cylinder disposed at a lower level than the master cylinder, with a hydraulic line connecting the cylinders, and an adjustable bleed nipple at the brake cylinder. The method includes the steps of filling a syringe with fluid and injecting it into the wheel cylinder via the open bleed nipple and through the hydraulic line to the master cylinder where air bubbles rise in the fluid therein and are dispersed to ambient air.

14 Claims, 4 Drawing Sheets

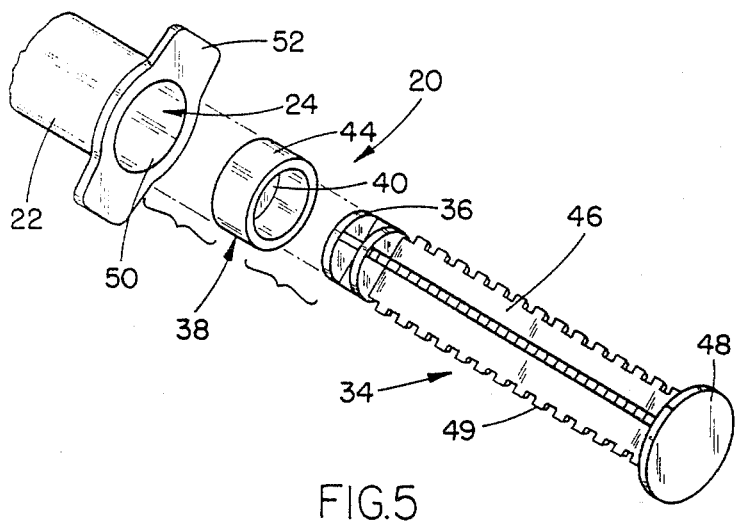
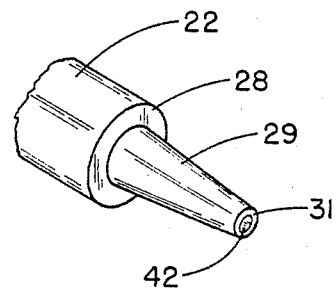
FIG.5  FIG.6
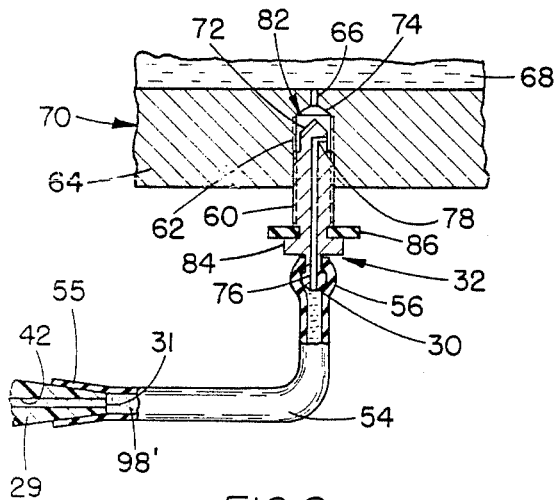
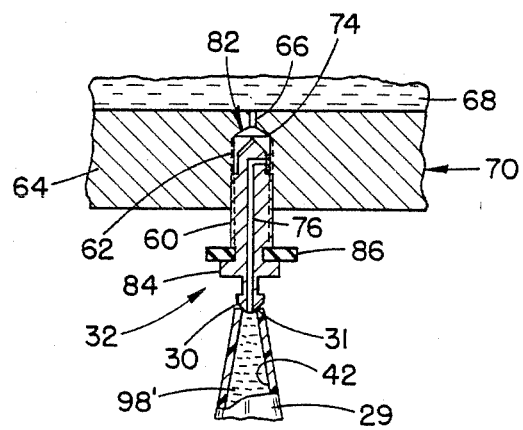
FIG.8  FIG.9
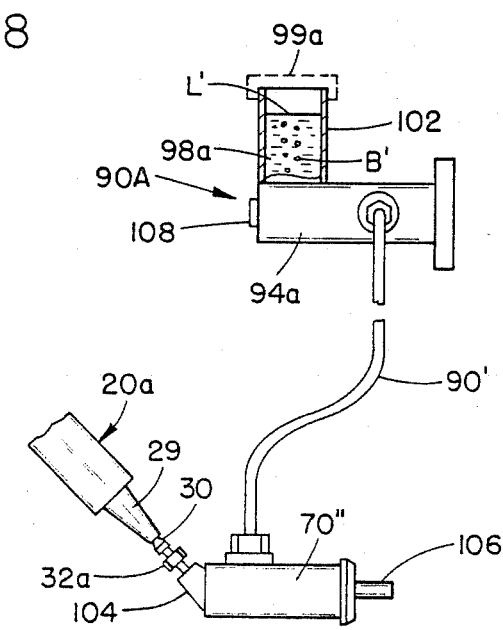
FIG.10

SYRINGE-DISPENSED BRAKE FLUID FOR FILLING AND PURGING MASTER CYLINDER CIRCUIT FROM SLAVEcl BACKGROUND OF THE INVENTION

1. Field of the Invention

This invention concerns a method and apparatus for removing air from a hydraulic system of the type having a master cylinder connected to one or more wheel or servo cylinders by a hydraulic line.

2. Description of the Prior Art

In conventional hydraulic brake systems used in motor driven vehicles, closable bleed openings are provided at wheel cylinders. Closure is provided by screw threaded nipples adapted to be screwed into screw threaded sockets in cylinder walls to close off the bleed openings. Bleeding of such hydraulic systems is done by unscrewing a nipple to clear the bleed opening, and then pumping the brake pedal of the vehicle to operate a piston at the master cylinder until the hydraulic fluid at the bleed opening of the wheel cylinder runs clear of any air. Thereafter, the bleed opening is closed by screwing the bleed nipple to seat it securely in the threaded socket and another bleed nipple is unscrewed and the foregoing procedure continued for each wheel cylinder.

A disadvantage of this system of bleeding is that one person is needed to operate the brake pedal to pump hydraulic fluid from the master cylinder through the wheel cylinder; and another person is needed to open the bleed, observe the bleed opening, and to close the bleed as soon as air stops issuing from it and the hydraulic fluid runs clear. Another disadvantage of this system of bleeding is that it is often not possible to bleed all the air out of system, especially air entrained as small dispersed bubbles.

It has been proposed, and U.S. Pat. No. 4,038,823, is an example of such proposal, to provide a method and means for bleeding a hydraulic system by introducing hydraulic fluid into the system via a bleed opening to cause the fluid to flow from the satellite, slave, or servo cylinder through the hydraulic line to the master cylinder. This method as proposed by the above mentioned patent requires removal of the screw threaded bleed nipple and replacement with a complex assembly of hydraulic connectors incorporating a one-way check valve and auxiliary bleeding chamber. The method has other serious disadvantages. For example, a long auxiliary hydraulic line almost equal to the length of the vehicle must be provided along with a reciprocating pump to drive hydraulic fluid into a wheel cylinder. Furthermore, since all the bleed nipples must be removed to make the system operative, the condition is often encountered where the screw threading of the bleed opening or socket is not the same as that of the hydraulic connectors which must replace the bleed nipples. This then requires special threaded adapters to match the hydraulic connectors to the bleed openings. If such adapters are not available, as often occurs, the bleed nipples cannot be replaced and the bleeding method cannot be used. Other difficulties occur because the reciprocating pump tends to overfill the master cylinder. For these reasons, as well as the high cost of precision valves and other precise parts, requirement of special tools for installation, complexity in valve and connector construction and operation, etc..., the prior proposed method has not proven practical, nor has it achieved commercial acceptance.

SUMMARY OF THE INVENTION

The present invention is directed at overcoming the above mentioned and other difficulties and disadvantages of prior bleeding methods and means for hydraulic systems, in a remarkably simple, inexpensive, and effective manner, without requiring special tools or special skills. According to the invention, there is provided a syringe having a chamber of predetermined size for receiving hydraulic fluid. The syringe has a nozzle with an opening or outlet shaped to conform with the bleed nipple of a hydraulic brake wheel cylinder. The syringe forces the hydraulic fluid from the chamber, through a passage cleared by a partially unscrewed bleed nipple, through the wheel cylinder and hydraulic line to the master cylinder. The master cylinder is located at an elevation above that of the wheel cylinder so that air bubbles entrained in the hydraulic fluid rise naturally under the pressure in the fluid to discharge above the level of hydraulic fluid in the master cylinder. The same air removal method and means are also applicable to a hydraulic clutch system in a vehicle, as well as to other hydraulic systems having a master cylinder supplying fluid to one or more satellite, slave, or servo cylinders.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 5 is an exploded isometric view of parts of the syringe of FIG. 1;

FIG. 6 is an isometric view of part of the outlet end of the syringe;

FIG. 8 is an enlarged fragmentary sectional view similar to a portion of FIG. 7, showing details of the direct connection of the syringe nozzle and connecting tube to the bleed outlet of a satellite, slave, or servo cylinder in the hydraulic system of FIG. 7;

FIG. 9 is an enlarged fragmentary sectional view similar to FIG. 8 showing details of the syringe nozzle forcing hydraulic fluid directly into a satellite, slave, or servo cylinder of the hydraulic system of FIG. 7;

FIG. 10 is an elevational view partially diagrammatic in form and partly in vertical section of another hydraulic system having just one satellite, slave, or servo cylinder, showing the syringe in position for forcing hydraulic fluid directly into the single satellite cylinder of the system.

DESCRIPTION OF THE PREFERRED EMBODIMENTS

Figure 1:
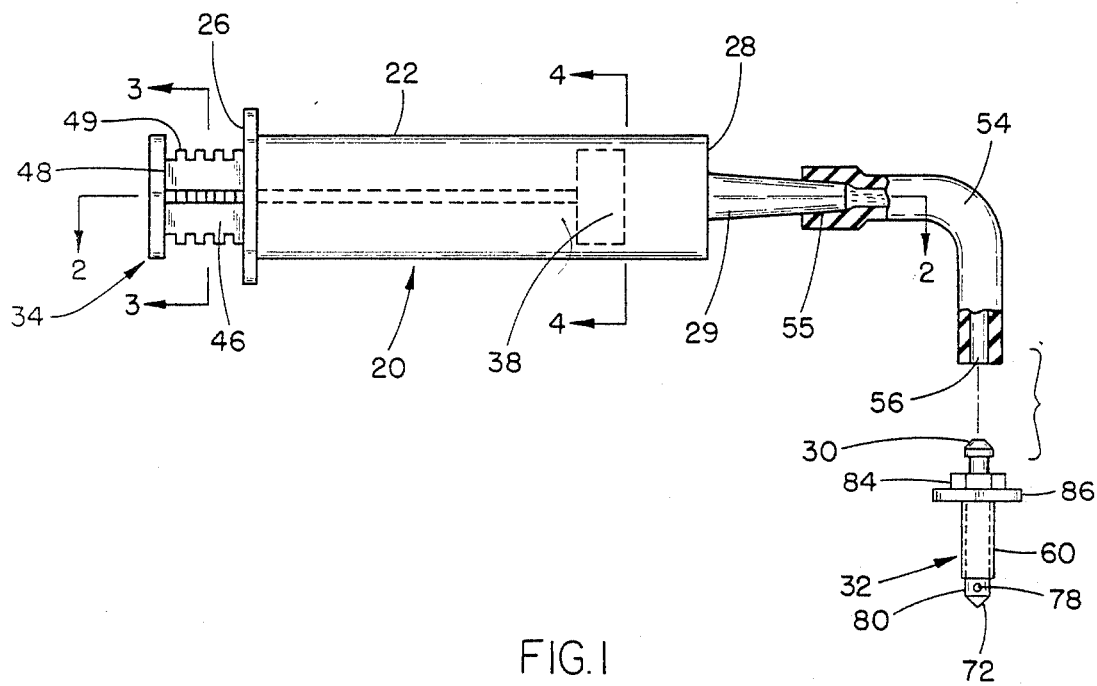
FIG. 1 is a side elevational view of a syringe for ejecting or removing air from a hydraulic system, the syringe being arranged according to the invention with an associated connecting tube, shown adjacent to a bleed valve or nipple of a hydraulic cylinder.
Figure 2:
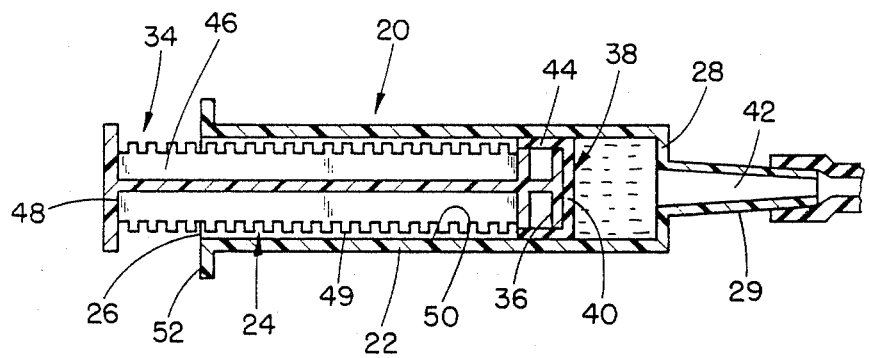
FIG. 2 is a longitudinal, axial sectional view taken along line 2—2 of FIG. 1.
Figure 3:
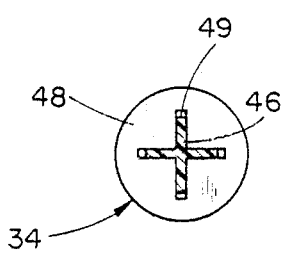
FIG. 3 and FIG. 4 are enlarged cross sectional views taken along line 3—3 and 4—4 respectively of FIG. 1.
Figure 4:
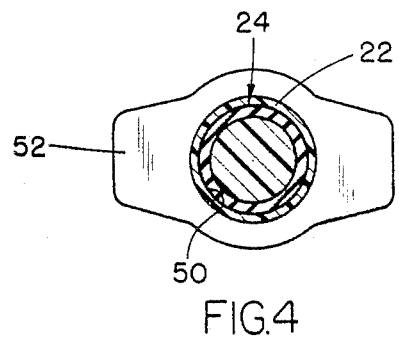

Referring now to the drawings wherein like reference characters designate like or corresponding parts throughout, there is illustrated in FIGS. 1-6 a syringe generally designated by reference numeral 20 forming part of the invention. The syringe 20 has a cylindrical barrel 22 defining a cylindrical chamber 24 therein. One end 26 of the barrel 22 is open and at the other annular end 28 is a frusto-conical nozzle 29 extending axially therefrom. The nozzle 29 terminates in an outlet 31 (FIG. 6) shaped to conform with the apertured head 30 at one end of a nipple 32 used to open and close the bleed opening of a cylinder in a hydraulic system as explained below in connection with FIGS. 7-10. Inside the barrel 22 and axially movable therein is a plunger 34 having a round head 36 at one end adapted to fit snugly inside a rubber cap 38. The cap 38 has a closed circular disk-like end wall 40 which will abut the inside of the end wall 28 to an close axial passage 42 in the nozzle 29. The cap 38 has a cylindrical wall 44 which fits snugly inside the chamber 24 and it slides frictionally when the plunger 34 is moved axially in the barrel 22. The plunger 34 has flat ribs 46 integral with the head 36 at the inner end of the plunger 34. The ribs 46 extend perpendicularly to each other radially of the barrel 22. The ribs 46 extend axially of the barrel 22 from the head 36 and terminate in an integral disk-like head 48 outside of the barrel 22. The serrated edges 49 of the ribs 46 are slightly spaced radially from an inner cylindrical wall 50 of the barrel 22 which has an annular radially extending flange 52 at its end adjacent the plunger head 48 to facilitate manually grasping the barrel 22 when the syringe 20 is in use. A short, flexible, elastic tube 54 may be engaged securely at one open end 55 on the open outlet end of the nozzle 29; see FIG. 1. The other open end 56 of the tube 54 may be engaged on the apertured head 30 of the nipple 32. The tube 54 can be bent at a right angle as shown in FIG. 1.

Referring now to FIGS. 1, 8, and 9 where the bleed nipple 32 is best shown, it will be noted that the nipple 32 has a threaded stem 60 which may be screwed in an out, axially, of a threaded socket 62 in a wall 64 of a hydraulic cylinder 70. The socket 62 terminates in an axial bore 66 opening into the interior of the cylinder normally filled with hydraulic fluid 68. The nipple 32 has a closed tapered end 72 which can seat firmly in abutment with a concave wall 74 at the inner end of the socket 62 to close off the interior of the cylinder 70 from the ambient exterior of the cylinder 70. A bore 76 extends axially of the nipple 32 and terminates in a radial opening 78 at one side of a tip 80 of the nipple 32. The tip 80 is smaller in diameter than that of the socket 62 to define a continuous passage 82 from the interior of the cylinder 70 via the bore 66 to the passage 76 in the nipple 32. The passage 76 is open to the exterior of the cylinder 70 at the head 30 of the nipple 32. A continuous passage thus exists between the nipple head 30 and the interior of the cylinder 70 when the nipple 32 is partially screwed axially outward of the socket 62 as clearly shown in FIGS. 8 and 9. Integral lands 84 define a hexagonal member which may be turned by a suitable tool to screw the nipple 32 axially in and out of the socket 62. A washer 86 may be engaged on the nipple 32 between the threaded stem 60 and the lands 84 to help seat the nipple 32 when fully threaded into the bore 62.

Figure 7:
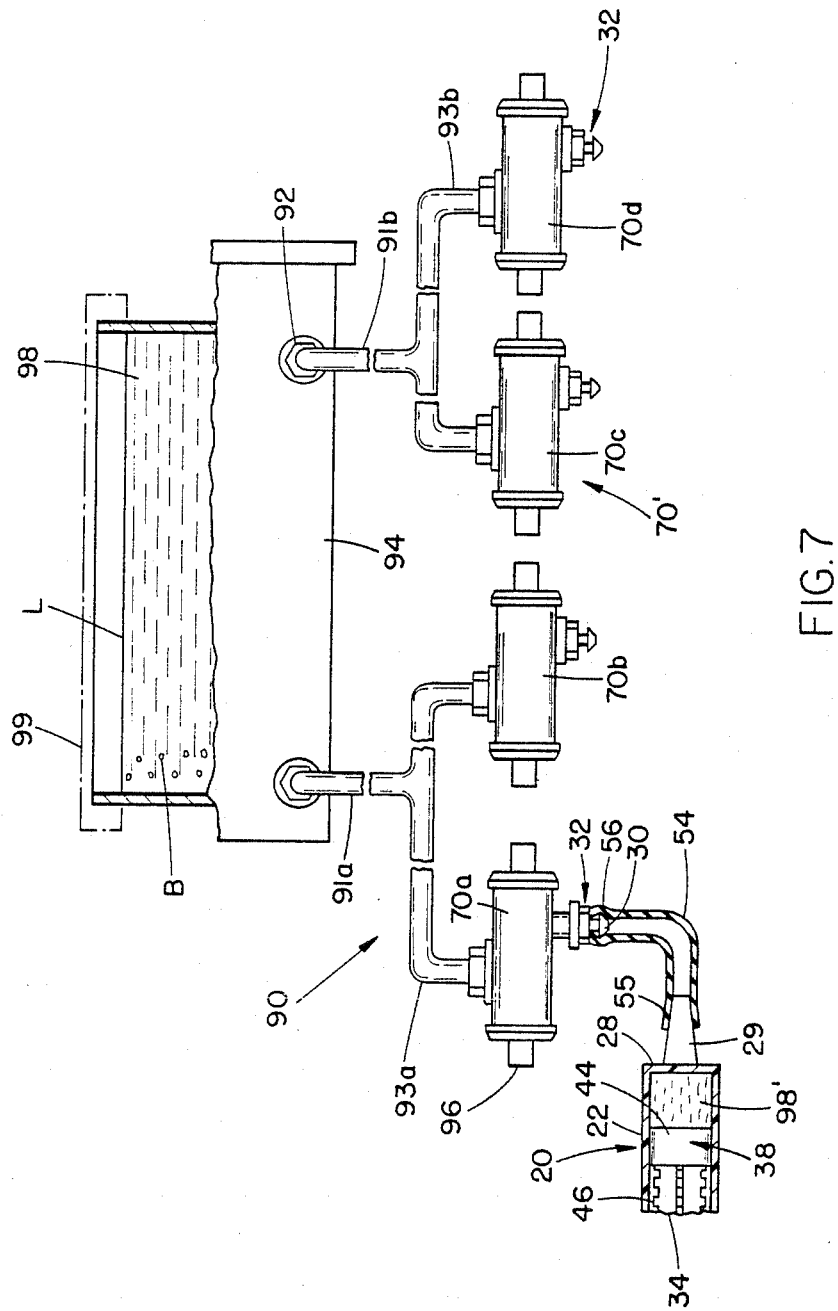
FIG. 7 is an elevational view partially diagrammatic in form and partly in vertical section of a hydraulic system having a plurality of satellite, slave, or servo cylinders, showing the syringe in position at one of the cylinders for ejecting air from the system.

FIG. 7 shows the end 56 of the tube 54 engaged on the head 30 of the bleed nipple 30 of one cylinder 70a of a group of four wheel cylinder 70' in a hydraulic braking system generally designated as reference numeral 90 of a vehicle. Two hydraulic lines 91a, 91b are connected to two outlets 92 in a master brake cylinder 94. Two branch lines 93a are connected to two satellite, wheel cylinders, or calipers 70a, 70b and to the line 91a. Two other branch lines 93b are connected between two other satellite, wheel cylinders, or calipers 70c, 70d, and the line 91b. Each satellite or servo cylinder has one or more pistons 96 at opposite ends for actuating wheel brake shoes (not shown) when a hydraulic liquid 98 in the brake master cylinder 94 is forced by operation of the vehicle's brake pedal through the hydraulic lines 91a, 91b, 93a, 93b to the four satellite or wheel cylinders 70'.

A preferred method of expelling air from the hydraulic brake fluid in the hydraulic system 90 will now be explained with particular reference to FIGS. 7 and 8 and flow chart 100 of FIG. 11. In step #1 the master brake cylinder 94 is opened to ambient air by removing a cylinder cover or cap 99 indicated by dotted lines in FIG. 7. In step #2 the master brake cylinder 94 is filled with the hydraulic fluid 98 to a specified level L. Now in step #3, the syringe 20 is filled with hydraulic fluid 98'. It is preferred that the syringe 20 be filled by fully inserting the plunger 34 in the barrel 22, then inserting the open end 31 of the nozzle 29 into the fluid 98 below the level L in the master cylinder 94. Then the plunger 34 should be carefully withdrawn to completely fill the chamber 24 in the barrel 22, with no air space or air bubbles. One reason the fluid is not drawn from a separate container is to avoid overfilling the master cylinder 94 when fluid is returned to it during operation of the syringe 20, at each of the four wheel or servo cylinders 70'. A second reason is to insure that the viscosity and nature of the fluid to be applied to the wheel cylinders 70' is the same as that in the master cylinder 94. It is also a very convenient way of filling the syringe 20. The syringe 20 should be held in axially upright position to prevent spillage of the fluid in chamber 24, and the plunger 34 depressed so that a small amount of fluid is expelled, thereby insuring that there is no air in the chamber 24.

In step #4, the bleed outlet valve or bleed nipple 32 is opened at the first wheel or servo cylinder 70a by slightly unscrewing the nipple 32. This opens the passage 82 in the bore 62. The tube 54 is then connected to the nozzle 29 of the syringe 20 and to the head 30 of the nipple 32 as shown in FIGS. 7 and 8. Alternatively, the nozzle 29 can be applied directly to the apertured head 30 of the nipple 32 as shown in FIG. 9. The contoured end 31 of the nozzle 29 will make a hermetic sealing engagement with the nipple 32 to prevent leakage of the fluid 98 out of the cylinder 70, and to prevent entry of air into the nozzle 29 or the hydraulic cylinder 70.

In step #6, the plunger 34 is moved manually axially inward of the barrel 22 to force the hydraulic fluid 98' through the nozzle 29, the nipple 30, the cylinder 70, the lines 93a, and 91a, and into the master cylinder 94. Since the elevation of master cylinder 94 is above the wheel servo or satellite cylinders 70', air under pressure in the hydraulic system 90 will rise naturally as bubbles B to level L of the fluid 98 and will be expelled thereat. After all the fluid 98' is discharged from the syringe 20, the bleed outlet of the cylinder 70a may be closed by screwing the nipple 32 tightly into the bleed bore 62 seat the tip end 72w at the recess 74 in the bore 74. This completes step #7. Then step #8 may be performed to remove the syringe 20 by detaching the tube 54 from the closed nipple 32, or by simply withdrawing the syringe 20 if the nozzle was abutted to the nipple as shown in FIG. 9.

Figures 11, 12:
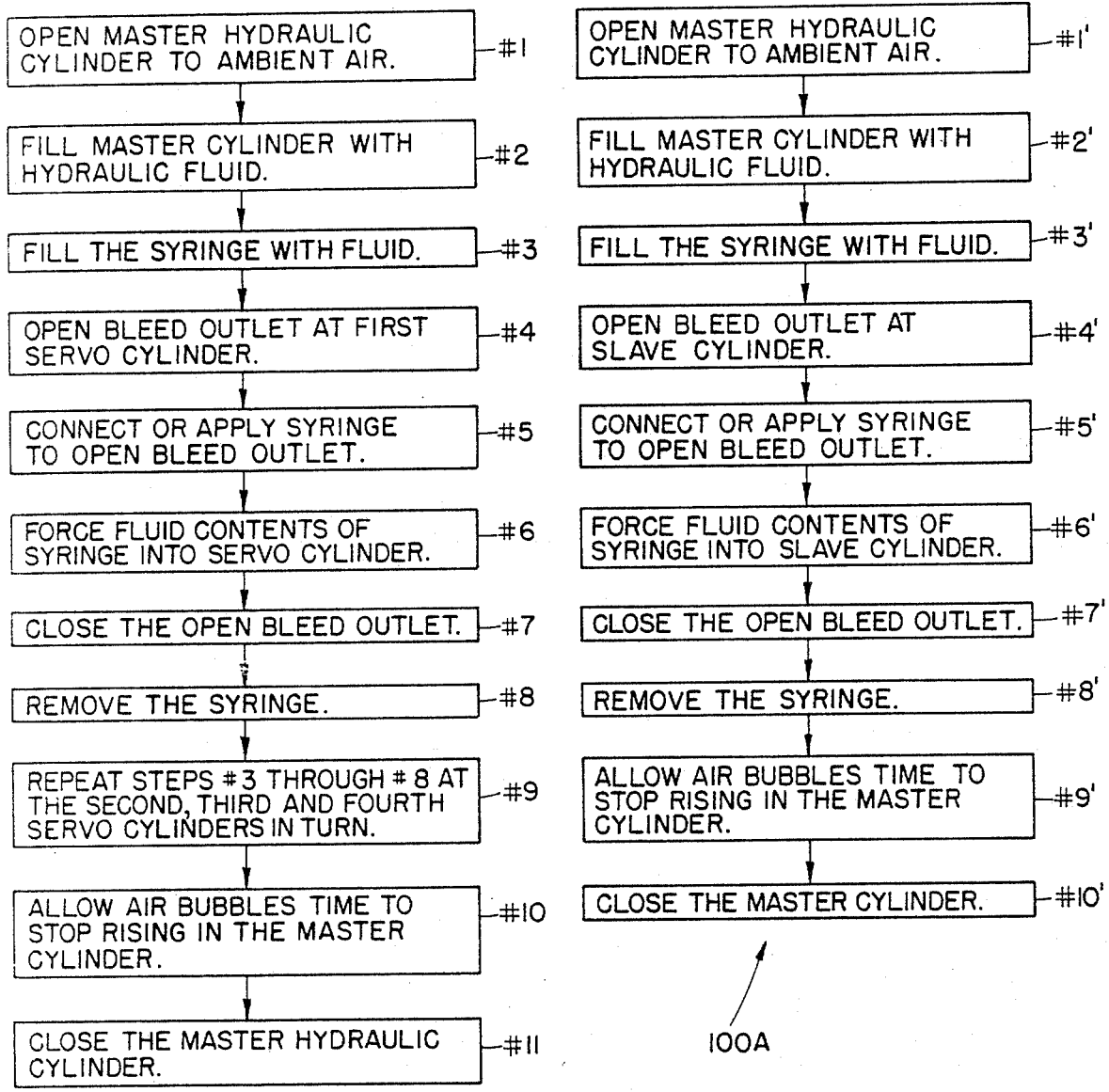
FIG. 11 and FIG. 12 are flow charts of two methods for ejecting air from the hydraulic systems of FIGS. 7 and 10 respectively.

The operation can be continued by repeating steps #3 through #8 for each of the cylinders 70b, 70c, 70d as indicated by step #9 in FIG. 11. After the removal of the syringe 20 from the last closed nipple 32, the open master cylinder 94 should be observed during step #10. Time should be allowed depending on the fluid viscosity to permit very small air bubbles B to collect and be dispelled at level L of fluid 98 in the master cylinder 94. In prior hydraulic bleeding methods such fine bubbles will escape notice and will not be expelled so that they later collect and materially reduce the braking efficiency of the hydraulic system. After all air bubbles B are dissipated in ambient air, the cover 99 should be replaced to close the master brake cylinder to complete step #11.

If the hydraulic system has just one satellite, slave, or servo cylinder the method 100A of the chart in FIG. 12 can be followed. The method will be explained with particular reference to the hydraulic clutch system 90A of FIG. 10 which employs a single satellite or slave cylinder 70″ and which is connected to a master clutch cylinder 94a by the hydraulic line 90′. The master cylinder 94A has a reservoir 102 filled to level L′ with hydraulic fluid 98a. Cylinder 70″ has an extension 104 in which is mounted a nipple 32a normally closing the bleed opening to the cylinder in the same manner as shown in FIGS. 8 and 9. The cylinder 94 has a piston 106 which is actuated during normal operation of piston 108 at the master cylinder 94A by the clutch pedal in the vehicle where the system is installed.

In the method 100A set forth in FIG. 12, at step #1′ the cover 99a of the reservoir 102 is opened. In step #2′, the master cylinder 94a is filled with approved hydraulic fluid 98a to level L′. In step #3′, the syringe 20a is filled by drawing the fluid 98a from the reservoir 102. In step #4′, the bleed nipple 32a at the cylinder 70′ is opened by turning as explained above in connection with FIGS. 8 and 9. In step #5 the syringe 20A is connected to the nipple 32a by means of the tube 54, or alternatively, the nozzle 29 can be applied directly to the head 30 as shown in FIG. 10. In step #6′, the fluid contents of the syringe 20a are forced via the nozzle 29, the nipple 32a, the cylinder 70″ and the hydraulic line 90′ into the master cylinder 94a. There as shown in FIG. 10, air bubbles B′ rise to a level L′ of the fluid in the reservoir 102 and are there dissipated. In step #7′, the bleed nipple 32a is closed at the cylinder 70″ and in step #8′ the empty syringe 20a is removed. In step #9′, time is allowed for the air bubbles B′ to collect and disperse; and then in step #10′ the master cylinder 94a is closed by replacing the cover 99a.

It will be noted that in both methods 100 and 100A no fluid or very little fluid can escape from the system. Thus, this is not a fluid bleed system or method in the conventional sense. Actually no bleeding of fluid takes place at all. What is accomplished is the expulsion of entrapped air in the hydraulic fluid with substantially no fluid loss, as occurs in prior fluid bleeding methods. Since no fluid is bled out of the system, many disadvantages of prior bleeding methods and systems are avoided. The entire method is cleaner. Soiling and pollution of the work place and operating personnel by bled fluid is avoided. An economy is effected by avoiding repeated loss of expensive hydraulic fluid, heretofore experienced with prior bleeding methods. No fluid has to be replaced in the master cylinder due to avoidance of fluid loss during the air expulsion process. In general the present method is faster, simpler, less costly, more efficient, requires only one person, and cleaner; and it provides more satisfactory results than prior bleeding methods and systems. The syringe which is the principal instrument can be made entirely of synthetic plastic materials at very low cost. After several uses, or even after one use the inexpensive syringe may be discarded. It will be further noted that at no time is it necessary to entirely remove the nipples 32 and 32a from the satellite, slave, or servo cylinders. They simply have to be loosened one at a time. This is very advantageous over prior bleeding methods and systems since the nipples are often located in close, awkward quarters where their complete removal is difficult or even impossible. Furthermore, complete nipple removal results in undesired losses of fluid from the cylinders and is avoided by the present invention.

It should be understood that the foregoing relates to only a limited number of preferred embodiments of the invention, which have been by way of example only and that it intended to cover all the changes and modifications of the example of the invention herein chosen for the purpose of the disclosure, which do not constitute departures from the spirit and scope of the invention.

What is claimed is:

1. In a hydraulic fluid system comprising a master cylinder, a servo cylinder located at a lower elevation than the master cylinder, a hydraulic line connecting the master cylinder and the servo cylinder to conduct hydraulic fluid between the cylinders, and an adjustable bleed nipple at said servo cylinder, said nipple having a normally closed passage opening into said servo cylinder when said nipple is opened, the method of removing air from hydraulic fluid in the hydraulic system, comprising the steps of:
 opening said master cylinder to ambient air;
 providing a syringe;
 filling said syringe with hydraulic fluid;
 opening said nipple;
 placing said syringe in direct communication and sealing relationship with said nipple and said passage and the interior of said servo cylinder;
 pressure feeding said fluid from said syringe directly through said passage, said servo cylinder and said hydraulic line to said master cylinder; and
 allowing bubbles of air entrapped in said fluid to rise in said master cylinder and to disperse thereat into ambient air.

2. A method as defined in claim 1, wherein said hydraulic fluid with which said syringe is filled is drawn from said master cylinder to prevent said master cylinder from becoming overfilled with said fluid when said fluid returns to said master cylinder from said servo cylinder.

3. A method as defined in claim 1, wherein said sealing relationship with said nipple and said passage is such that ambient air is prevented from entering said passage at said seal, and that said fluid is prevented from leaking out of said passage to ambient air at said seal, while said fluid enters said passage under pressure from said syringe.

4. A method as defined in claim 1, comprising the further step of connecting a flexible tube between said syringe and said nipple, so that said sealing relationship with said nipple and said passage is such that ambient air is prevented from entering said passage at said tube connection thereat, and that said fluid is prevented from leaking out of said passage to ambient air at said tube connection, while said fluid enters said passage under pressure from said syringe.

5. A method as defined in claim 1, comprising the further step of closing said passage to put said servo cylinder in condition for receiving fluid under pressure from said master cylinder without leakage from said servo cylinder at said passage.

6. A method as defined in claim 5, comprising the further step of closing said master cylinder to prevent ambient air from entering said master cylinder.

7. A method as defined in claim 5, wherein said system further comprises another servo cylinder connected by said hydraulic line to said master cylinder, said other servo cylinder having another bleed nipple, said other nipple having another normally closed passage therein, said method comprising the further steps of:
   removing said syringe from said first nipple and passage;
   filling said syringe a second time with hydraulic fluid;
   placing said syringe in direct communication and a second sealing relationship with said other nipple and said other passage;
   pressure feeding said fluid from said syringe directly through said other passage, said other servo cylinder, and said hydraulic line to said master cylinder; and
   allowing further bubbles of air entrapped in said fluid to rise in said master cylinder until said further bubbles are dispersed to ambient air thereat.

8. A method as defined in claim 7, wherein said hydraulic fluid with which said syringe is filled a second time is drawn from said master cylinder to prevent said master cylinder from becoming overfilled when said fluid returns to said master cylinder from said second servo cylinder.

9. A method as defined in claim 7, wherein said second sealing relationship with said other nipple and said other passage is such that ambient air is prevented from entering said other passage and said fluid is prevented from leaking out of said other passage to ambient air while said fluid enters said other passage under pressure from said syringe.

10. A method as defined in claim 9, comprising the further step of closing said other passage to put said other servo cylinder in condition for receiving fluid under pressure from said master cylinder without leakage from said servo cylinder at said other passage.

11. A method as defined in claim 10, comprising the further step of closing said master cylinder to prevent ambient air from entering said master cylinder.

12. Means for removing air from a hydraulic fluid in a hydraulic system having a master cylinder, a servo cylinder disposed at a lower elevation than said master cylinder, a hydraulic line connecting the master cylinder and the servo cylinders to conduct hydraulic fluid between the cylinders, and an adjustable bleed nipple disposed at said servo cylinder, said nipple having a normally closed passage opening into said servo cylinder when said nipple is opened, said means comprising:
   a syringe having a cylindrical barrel;
   an open nozzle at one end of said barrel;
   a plunger movable axially in said barrel to draw fluid into said barrel when said plunger is axially retracted, and to expel said fluid from said barrel and through said nozzle when said plunger is advanced in said barrel, said nozzle being adapted for disposition in sealing relationship with said nipple to seal said passage, so that said fluid is prevented from leaking to ambient air at said seal when said fluid is forced by said plunger out of said syringe and through said passage, said servo cylinder, and said hydraulic line to said master cylinder, where air bubbles in said fluid rise and are dispersed to ambient air.

13. Means as defined in claim 12, further comprising a short, flexible tube connected at one end to said nozzle and connected at its other end to said nipple to establish and maintain seals at said nozzle and said nipple for preventing leakage of said fluid thereat to ambient air and for preventing leakage of ambient air into said passage.

14. Means as defined in claim 12, wherein said master cylinder is open to ambient air to disperse said air bubbles, and wherein said fluid filling said barrel is drawn from said master cylinder to avoid overfilling the same when said fluid is returned to said master cylinder from said servo cylinder

* * * * *